(12) United States Patent
Maloney et al.

(10) Patent No.: US 9,816,545 B2
(45) Date of Patent: Nov. 14, 2017

(54) FASTENER WITH A BELLEVILLE HEAD

(71) Applicant: PEM Management, Inc., Wilmington, DE (US)

(72) Inventors: Michael J. Maloney, Doylestown, PA (US); Brian Bentrim, Furlong, PA (US); William McDonough, Collegeville, PA (US)

(*) Notice: Subject to any disclaimer, the term of this patent is extended or adjusted under 35 U.S.C. 154(b) by 10 days.

(21) Appl. No.: 14/471,020

(22) Filed: Aug. 28, 2014

(65) Prior Publication Data

US 2015/0063944 A1 Mar. 5, 2015

Related U.S. Application Data

(60) Provisional application No. 61/871,019, filed on Aug. 28, 2013.

(51) Int. Cl.
*F16B 35/00* (2006.01)
*F16B 35/06* (2006.01)
*F16B 19/06* (2006.01)

(52) U.S. Cl.
CPC ............. *F16B 35/06* (2013.01); *F16B 19/06* (2013.01)

(58) Field of Classification Search
CPC ........................................ F16B 35/06
USPC ............... 411/378, 392, 501, 9, 11, 314
See application file for complete search history.

(56) References Cited

U.S. PATENT DOCUMENTS

| | | | |
|---|---|---|---|
| 1,395,960 A | 11/1921 | Hills | |
| 1,875,930 A * | 9/1932 | Martin | F16B 39/26 29/509 |
| 2,226,491 A * | 12/1940 | Gustafson | F16B 35/06 411/186 |
| 2,371,452 A | 3/1945 | Lees, Jr. | |
| 3,030,997 A * | 4/1962 | Collins | F16B 33/004 411/260 |
| 3,168,321 A * | 2/1965 | Glicksman | F16B 43/001 277/637 |
| 3,367,907 A * | 2/1968 | Hansen | C08K 5/3475 524/91 |
| 3,469,490 A | 9/1969 | Pearce, Jr. | |
| 3,557,654 A * | 1/1971 | Weidner, Jr. | F16B 33/004 411/377 |
| 3,589,234 A | 6/1971 | Trigg | |

(Continued)

FOREIGN PATENT DOCUMENTS

JP 2000304019 10/2003

OTHER PUBLICATIONS

Singapore Search Report 11201601411U, Jan. 10, 2017.

(Continued)

*Primary Examiner* — Gary Estremsky
(74) *Attorney, Agent, or Firm* — Ryder, Lu, Mazzeo & Konieczny LLC; Joseph M. Konieczny, Sr.; Gregory J. Gore

(57) ABSTRACT

The present invention relates to headed push-in fasteners of the type produced by Penn Engineering & Manufacturing Corp. known as TackPins and TackScrews. More specifically it relates to a Tack Pin or a Tack Screw with a Belleville head that provides the functionality of a Bellville washer without needing a separate part. When installed, the compression of the Bellville shaped head will cause a permanent loading to be applied under the head of the fastener, essentially creating a clamping force to the members being attached.

10 Claims, 2 Drawing Sheets

BELLEVILLE SPRING INCORPORATED INTO THE HEAD OF A TACK PIN, TACK SCREW, AND A MICRO SCREW OF SIMILAR SIZE.

(56) References Cited

U.S. PATENT DOCUMENTS

| | | | | |
|---|---|---|---|---|
| 3,687,184 | A * | 8/1972 | Wagner | F16B 43/00 411/135 |
| 3,815,220 | A * | 6/1974 | Briles | B21J 15/02 29/509 |
| 3,834,269 | A * | 9/1974 | Ohringer | F16B 31/024 411/9 |
| 4,002,099 | A * | 1/1977 | Bradley | F16B 19/1054 411/70 |
| 4,112,811 | A * | 9/1978 | King | F16B 19/05 29/243.522 |
| 4,202,243 | A * | 5/1980 | Leonhardt | F16B 5/04 29/524.1 |
| 4,295,767 | A * | 10/1981 | Temple, Jr. | F16B 33/004 411/377 |
| 4,310,272 | A | 1/1982 | Rich et al. | |
| 4,347,024 | A * | 8/1982 | Coldren | F16B 31/028 411/11 |
| 4,350,465 | A | 9/1982 | Lovisek | |
| 4,435,112 | A * | 3/1984 | Becker | F16B 5/02 29/453 |
| 4,441,835 | A * | 4/1984 | Davis | E05D 11/081 403/162 |
| 4,472,097 | A * | 9/1984 | Kiefer | B60Q 1/0433 36/134 |
| 4,472,098 | A * | 9/1984 | Kiefer | B60Q 1/0433 36/134 |
| 4,875,181 | A * | 10/1989 | Hagemeyer | H03K 19/00 326/37 |
| 4,875,818 | A | 10/1989 | Reinwall | |
| 5,333,978 | A * | 8/1994 | Rives | B60Q 1/0433 411/369 |
| 5,613,815 | A | 3/1997 | Muller | |
| 5,697,141 | A * | 12/1997 | Denham | F16B 5/04 29/243.522 |
| 6,709,211 | B1 * | 3/2004 | Knecht | F16B 35/06 411/176 |
| 7,293,948 | B2 * | 11/2007 | Bunch, Jr. | F16B 31/04 411/392 |
| 7,374,382 | B2 | 5/2008 | Bentrim | |
| 8,616,039 | B2 * | 12/2013 | Maloney | B21K 1/60 470/27 |
| 2003/0175093 | A1 | 9/2003 | Dorfman | |
| 2006/0099047 | A1 | 5/2006 | Bentrim | |
| 2007/0071570 | A1 | 3/2007 | Smolarek et al. | |
| 2008/0260495 | A1 * | 10/2008 | Gong | F16B 25/0047 411/386 |
| 2014/0086704 | A1 * | 3/2014 | Hemingway | B29C 67/0051 411/392 |

OTHER PUBLICATIONS

China Search Report 201480058990.2, Feb. 23, 2017.
Europe Search Report 14840744.8-1760, Jun. 21, 2016.
Search Report from Taiwanese Patent Appln. No. 103129672, Jul. 6, 2017.

* cited by examiner

BELLEVILLE SPRING INCORPORATED INTO THE HEAD OF A TACK PIN, TACK SCREW, AND A MICRO SCREW OF SIMILAR SIZE.

FASTENER WITH A BELLEVILLE HEAD

RELATED APPLICATION

This patent application is a non-provisional of provisional patent application Ser. No. 61/871,019 entitled "Fastener with a Belleville Head" filed on Aug. 28, 2013, priority from which is hereby claimed.

FIELD AND OVERVIEW OF THE INVENTION

The present invention relates to very small headed push-in fasteners of the type produced by Penn Engineering & Manufacturing Corp. known as TackPins and TackScrews. More specifically, it relates to a Tack Pin or a Tack Screw with a Belleville head that provides the functionality of a Bellville washer without requiring a separate part.

BACKGROUND OF THE INVENTION

The attachment of two members can be made in a number of different ways. Some attachment methods such as adhesives, glues, or welding can form a strong bond between the members without generating any squeezing or clamping force between the members. Fasteners such as a typical rivet or tack pins/screws, also do not create a clamping force on the members. When a clamping force is desired, screws are a common method of achieving this.

Many consumer product assemblies are being designed with a thin-walled enclosure that is softer than the fasteners being used to assemble them. This coincidence works in favor of a self-clinching fastener which requires a hardness differential, and clinches at the surface of the panel. This is opposite for a screw however, and limits the available clamp load of the screw. In this case the limiting force for clamp load is equal to the yield strength of the threads engaged by the screw in the enclosure. This invention applies to this type of assembly.

Because complete stripping of the thread would render an assembly useless, the yield force is used for design purposes to calculate the maximum allowable induced load. The yield force of the female threads is calculated as the yield stress of the thread in the bottom panel as shown in FIG. 1, multiplied by the area of the thread that is in shear. The area of the thread in shear is the cylindrical surface per thread that would be left if a screw were to cut the threads out if pulled or pushed vertically. Because the effect of the thread helix on this area is very small, the area of thread in shear can be simplified to be the number of threads in shear multiplied by the cylindrical area of one thread.

In FIG. 1, the clamp load of the prior art is generated when the screw is tightened. Tightening the screw causes a tension force in the screw. That is to say the part of the screw between the underside of the head and the top of the engaging threaded member. Part of the clamp load generated stretches the screw like a spring. Hooke's Law describes the change in length of the screw. The shorter a screw is made, the less capable it is of stretching. Hooke's Law applies equally for the top panel, which is compressed by the clamp load. The force experienced by the top sheet is equal to the clamp load. In the case shown in FIG. 1, the panel is thin which also tends to limit the potential compression. It is the application of a hard screw into a thin soft enclosure that enables a clinch attachment to compete very well against a screw thread.

Referring now to FIG. 2 another example of a prior art fastener is depicted. Since a tack pin or a tack screw is pressed in, and is not in tension during installation, it can provide little or no clamp load. The compression of the top sheet can provide a component of clamp, however the situation is slightly different from the case of a screw. When the installation load is applied to the tack, and consequently the top sheet, both will change in length (shorten or compress) per Hooke's law. As long as the parts were not crushed beyond their yield points, both will relax (attempt to return to their original lengths) when the installation load is removed. We can remove force and express relative deflection in terms of known dimensions and material properties. Assuming homogenous properties of the bottom sheet, three different scenarios exist for pin compression compared to panel compression. Given our small part case, we can make the following statements: If the tack and panel have the same deflection, then they will spring back nearly equally after the punch is removed, and no clamp load would be generated. If the tack has a greater stiffness, and hence smaller deflection than the panel. Panel compression can happen, and consequently a small clamp load, given that the tack will spring back less than the panel tries to. If the panel has a greater stiffness, and hence smaller deflection than the tack, then no clamp will be generated. The tack might actually spring back higher than the attaching panel, leaving a small gap under the head. An example of where a tack pin/screw would create a small clamp load is where the top sheet might be a gasket material like rubber. As with the screw, the yielding of the undercut in the bottom sheet is the overriding maximum clamp load allowable for a tack pin/screw if the top sheet has the capability of generating such a force.

Clinching Tack pins/screws are an excellent alternative to very small screws, and provide numerous advantages over a screw, including:
1) No tapping of hole is required
2) Thread stripping as a failure is eliminated
3) Tack pins/screws are pressed in, as such installation is greatly simplified
4) Tack pins/screws do not require a thread locking patch and are inherently non-loosening
5) Tack pins/screws have very thin heads and permit thinner design forms than screws which require thicker heads due to the drivers required in the head.

However, some shortcomings of Tack Pins/Screws are:
1) Little or no clamp load (while it is minimal, a short screw does provide a bit of clamp load)
2) If under installed, a gap will be left under the head permitting axial float
3) Perfect installation, where the bottom of the head of the tack pin contacts the top sheet during installation, without over pressing, requires expensive equipment.

Simply adding a separate washer to the screw/pin of the assembly creates all of the problems associated with a greater number of parts and Belleville washers cannot be made small enough to be used with a micro screw or very small tack pins having a diameter in the range of 1.0 mm. There is therefore a need in the art for a new type of unitary fastener which when applied can provide a residual clamp load to the elements it has joined.

SUMMARY OF THE INVENTION

The shortcomings of tack pins and tack screws listed above are all overcome by a novel design change that would incorporate the design of a Bellville type spring into the head of the tack pin or tack screw. It is believed that with the spring head design improvement, the tack pin or screw can provide all the advantages of a short screw, with the added benefits afforded by ordinary tack pins where because of their miniature size adding a separate washer is not practical. The spring head structure can directly address the clamp load issue as well as adding tolerance to the installation pressing distance, easing the requirement of a perfect installation.

More specifically the applicant has invented a fastener and an assembly of parts comprising two elements, a top element and a bottom element face-to-face. The fastener comprises a head having a radially extending cone-shaped flange being the largest diameter of the fastener and having an uninterrupted peripheral circular surface adapted to resiliently deflect upwardly against the top element upon application of a downward installation force applied to the head which also causes the cold flow of material from the bottom element. The fastener has a shank which utilizes engagement means such as helical threads or a clinch undercut.

Therefore, it is the primary object of this invention is to add clamp load capability, and increase axial installation tolerance to a tack pin by means of incorporating the design of a Bellville washer into the head of the fastener. Given that the same feature can be added around the head of a micro screw, a secondary object is to devise a screw design that incorporates a Bellville washer into the head for the benefit of preventing loss of preload in the screw. It is a further objective to accomplish these advantages while also providing economy of manufacture and by eliminating an additional loose part that requires assembly.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENTS

Figure 1:
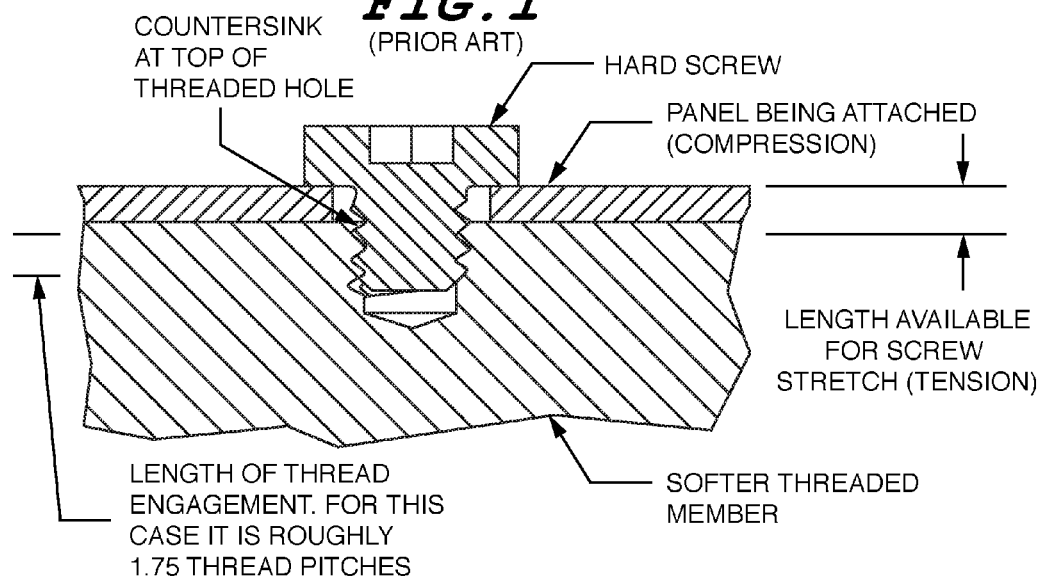
FIGS. 1 and 2 are cross-sectional views of prior art fasteners.
Figure 2:
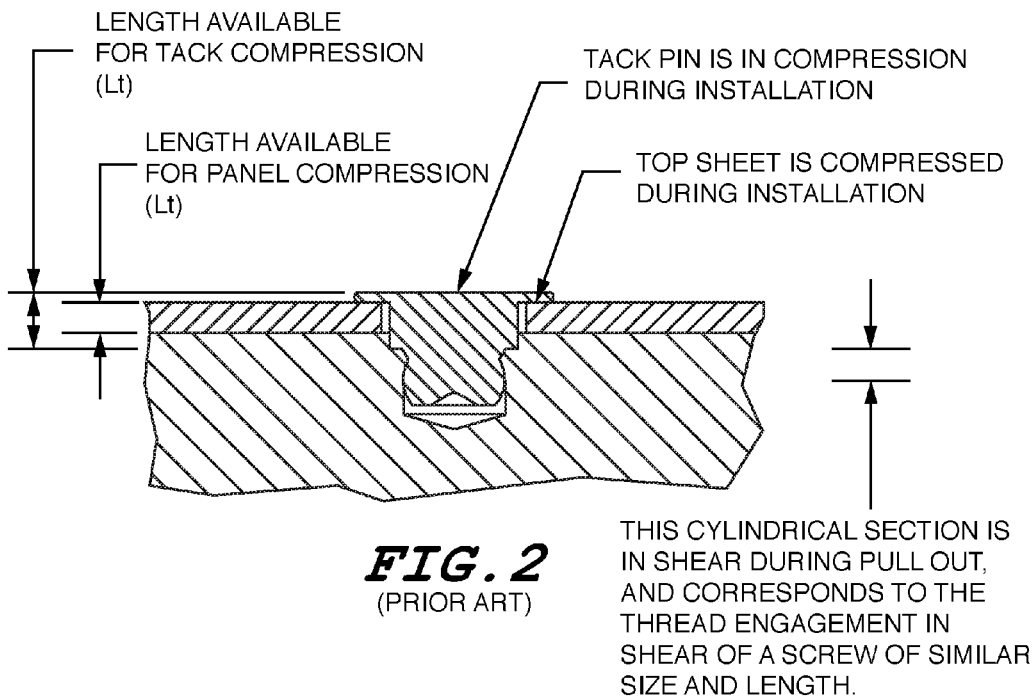
Figure 3:
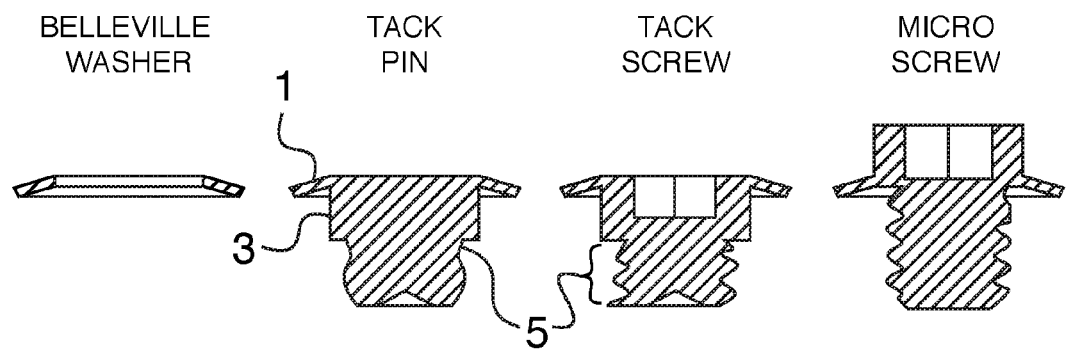
FIG. 3 is a cross-sectional view of three embodiments of the invention.

Referring now to FIG. 3, three embodiments of the fastener of the invention are shown in side-by-side comparison with a Belleville washer. Any one of the embodiments is utilized to create an assembly in place of the fasteners of the prior art shown in FIG. 1 or 2 which join a top sheet to a bottom sheet. Each of the tack pin and tack screw embodiments has a head which includes a cone-shaped flange, a displacer collar 3 and an undercut or threads 5 which approximates the structure and performance of a Belleville washer shown at the far left.

A Belleville washer creates force opposite to the direction of its compression. This figure depicts how a Belleville washer can be incorporated into the head of a tack pin, a tack screw, and a micro screw. The maximum force capability of a Belleville spring is given by equations that can be sourced from website Spring-I-Pedia at: http://springipedia.com/belleville-washers-formulas.asp.

Figure 4:
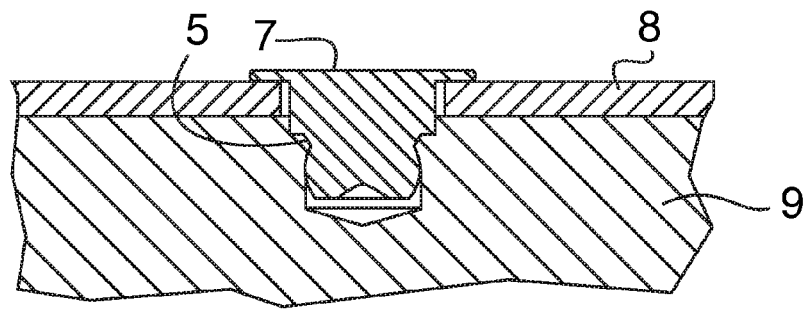
FIG. 4 is a cross-sectional view of an assembly utilizing the tack pin of FIG. 3.

Referring now to FIG. 4, the tack pin 7 of FIG. 3 is shown in an assembly of a top element 8 affixed face-to-face with a bottom element 9 by the cold flow of metal into the undercut 5 of the tack pin 7. Upon installation, the periphery of the cone-shaped flange deflects resiliently upward as it forcefully contacts the top sheet. By the resilient nature of its material a continual biasing force is applied so that a residual clamp load is maintained.

For the case of the tack pin with clamp load it is desirable to provide the minimum equivalent clamp force that can be provided by the yield of the metal in its undercut after installation. Incorporating the Bellville washer functionality into the head of at Tack Pin or screw effectively adds top sheet compression distance to the tack. This head design is advantageous where the top sheet changes in length to a greater degree than the tack pin or screw thus ensuring that a clamp load will be created. The deflection of the head in this instance is far greater than can be expected from the flat sheet alone. Similarly for the case of a micro screw, the design equation for a Belleville washer head, we set the force equation for the yield strength of the female threads engaged equal to the max force available for a Bellville washer.

In the case of the screw, the fact that the screw is installed in tension creates the clamp load, and the necessity of the Bellville head to do this is not as important as it is for the tack pin or a tack screw. A Bellville head incorporated into the screw, however does provide the added benefits of:
1) Protection against the loss of preload of the screw
2) Over installation protection, such that a greater range for the tightening torque can be specified.

From the above description of the invention it can readily be seen that the objects of the invention have been achieved. The incorporation of a Bellville washer type of head into the design of a tack pin provides the capability of supplying a clamp load to an assembly where tack pins are used, where previously only small clamp load was possible for a narrow range of conditions. Additionally the incorporation of this type of head to a tack pin adds tolerance to the installation pressing distance, that helps safeguard an over pressing, or over loading that can cause cosmetic damage. Finally for the tack pin, the elimination of a potential gap under the head, in the case of an under installed part, will give a more firm feel to the assembly. The added benefit of this type of head to a micro screw is that it provides protection against the loss of preload in the screwed joint, as well as installation tolerance on the required installation torque range. By combining the benefits of a separate washer into the structure of the fastener there are economies of manufacture and fewer problems with loose parts and the additional step of assembling the washer which may be impractical for miniature parts.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A unitary fastener for joining two elements, a top and a bottom element face-to-face, comprising:
    a head including a downwardly divergent cone-shaped flange being the largest diameter of the fastener, said flange having an uninterrupted circular periphery adapted to resiliently deflect upwardly; and
    a shank extending immediately downward from said head, said shank including a displacer collar being the largest diameter of the shank for displacing material of the bottom element and means for engaging at least a bottom one of said two elements, said engaging means comprising an undercut adapted to receive the cold flow of metal from said bottom one of said two elements displaced by the collar.

2. A unitary fastener for joining two elements, a top and a bottom element face-to-face, comprising:
    a head including a downwardly divergent cone-shaped flange being the largest diameter of the fastener, said flange having an uninterrupted circular periphery adapted to resiliently deflect upwardly; and
    a shank extending immediately downward from said head, said shank including a displacer collar being the largest diameter of the shank for displacing material of the bottom element and means for engaging at least a bottom one of said two elements, said engaging means comprising helical threads adapted to receive the cold flow of metal from said bottom one of said two elements displaced by the collar.

3. An assembly of parts, comprising:
    a fastener according to claim 1 or claim 2;
    a top element in face-to-face abutment with a bottom element, said top element including an aperture through which the shank of said fastener passes; and
    the shank of said fastener engaged with a cavity in said bottom element to a depth where the periphery of the fastener head flange is in forcible contact with the top element and deflected sufficiently to apply a downward resiliently biasing residual clamp load between said elements, said shank adapted to receive the cold flow of metal from said bottom element.

4. The assembly of claim 3, said engaging means consisting of an undercut adapted to receive the cold flow of material from said bottom one of said two elements.

5. The assembly of claim 3 constructed and arranged so that the cold flow of metal is caused by a downward installation force applied to the head.

6. The assembly of claim 3 wherein the fastener is a tack pin.

7. The assembly of claim 3 wherein the fastener has a diameter of 1.0 mm.

8. The fastener of claim 1, said engaging means consisting of an undercut adapted to receive the cold flow of metal from said bottom one of said two elements.

9. The fastener of claim 1 constructed and arranged so that the cold flow of metal is caused by a downward installation force applied to the head.

10. The fastener of claim 1, wherein the fastener is a tack pin.

* * * * *